May 28, 1957 W. G. DUCKHAM 2,794,107
MEANS FOR ELECTRICALLY HEATING VESSELS
Filed Jan. 25, 1955 2 Sheets-Sheet 1
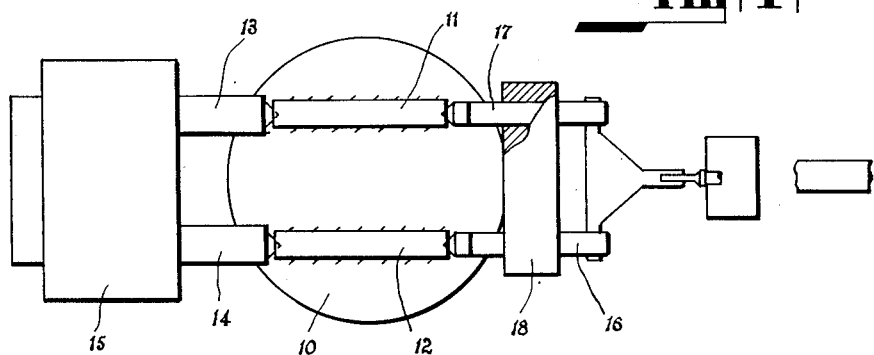
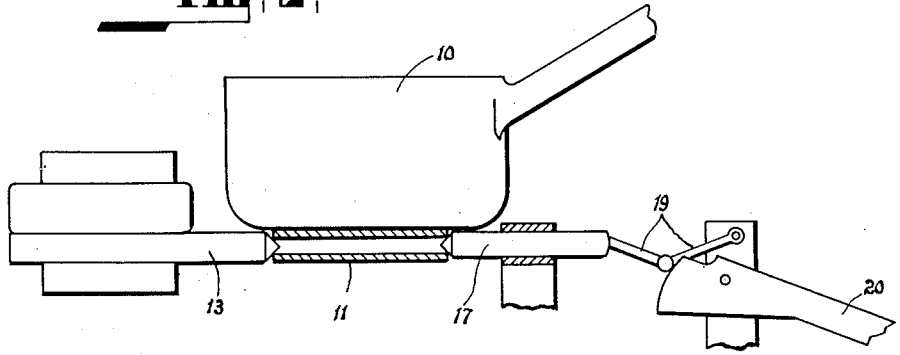
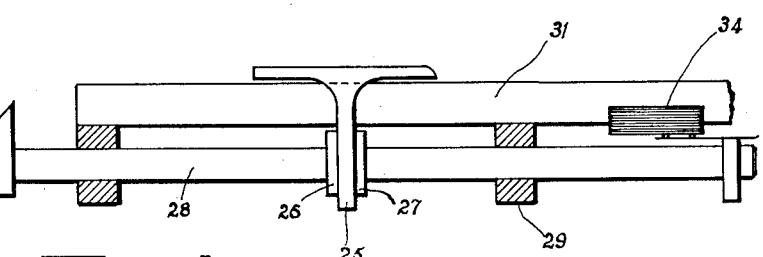
INVENTOR
WILLIAM GRAHAM DUCKHAM
By Linton and Linton
ATTORNEYS May 28, 1957 W. G. DUCKHAM 2,794,107
MEANS FOR ELECTRICALLY HEATING VESSELS
Filed Jan. 25, 1955 2 Sheets-Sheet 2
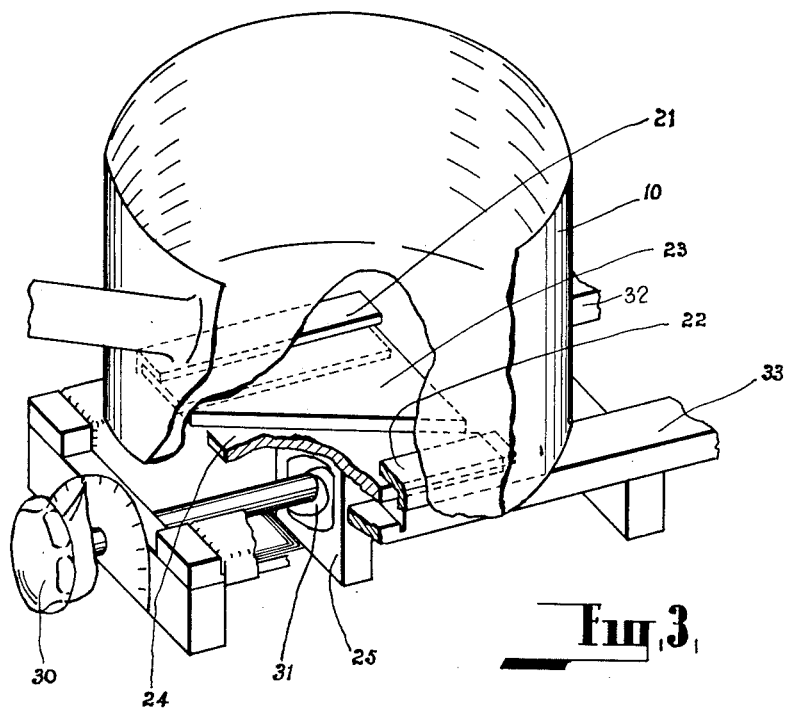
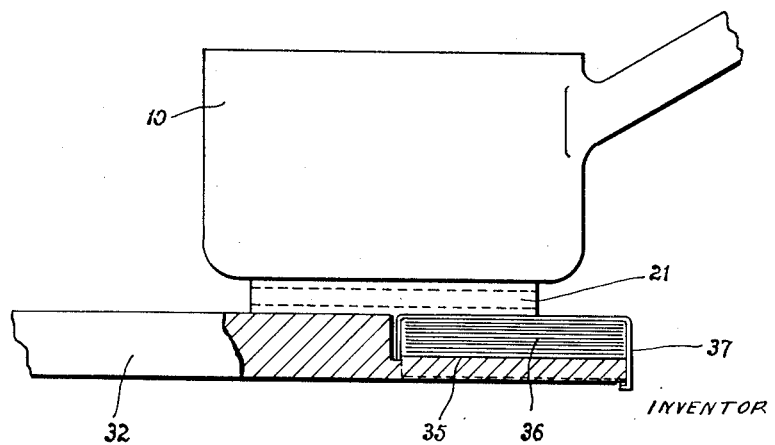
INVENTOR
WILLIAM GRAHAM DUCKHAM
BY Linton and Linton
ATTORNEYS

United States Patent Office 2,794,107
Patented May 28, 1957

2,794,107

MEANS FOR ELECTRICALLY HEATING VESSELS

William Graham Duckham, Belmont, Western Australia, Australia

Application January 25, 1955, Serial No. 483,917

Claims priority, application Australia February 8, 1954

2 Claims. (Cl. 219—43)

This invention relates to improvements for electrically heating saucepans, frying pans and other vessels.

It is well known that existing arrangements such as hot plates whereby heat is applied from an external source are thermally inefficient and slow. Various methods of improving the transfer of heat from the hot plate to the vessel have been suggested with varying degrees of success.

It is therefore an object of the present invention to provide a method of and means for electrically heating vessels which is relatively more efficient and which avoids the disadvantages of the known arrangements.

It has been found that the heat can be applied direct to the vessel by passing an electric current through the vessel. The resulting heat is rapidly transferred to the contents of the vessel so that there is a considerable increase in efficiency and reduction in the time taken for heating.

Accordingly the present invention resides broadly in means for electrically heating saucepans, frying pans and like vessels comprising electric conductors secured to the vessel, electric contacts connected to a source of low voltage current and manually operated pressure applying means for quickly engaging and disengaging the electric conductors and the electrical contacts.

The low voltage current is normally obtained from a suitable transformer connected to the mains supply. The voltage employed is dependent upon the nature of the material of which the vessel is constructed. Although aluminium is deservedly popular for cooking utensils and the like, it has a high electrical conductivity and consequently requires a very low voltage and is not the most suitable for the purposes of the present invention. Enamelled iron vessels are suitable but the conductor bars to be connected to the bottom thereof may only be soft-soldered if the enamel is to be preserved. On the other hand, stainless steel has a low electrical conductivity and admits of contacts being silver-soldered and is most suitable for the purposes of the present invention.

The vessels used should be as thin as is consistent with mechanical strength. It is found that under the foregoing conditions a density of 75 watts per square inch of bottom surface gives very fast cooking at a speed three times that of a hot plate and about 150% that of gas.

When stainless steel is employed for heating at full capacity, a voltage of from 0.7 to 1.2, dependent on the thickness and the specific resistance of the material used is satisfactory. For slower heating the voltage may be reduced as desired. The transformer employed should have as short a secondary conductor as possible, while it is considered that the primary and secondary copper losses should not exceed 4% and iron losses should be kept down to 3%. Up to 2000 watts, the primary winding may be of enamelled copper wire, but for a higher output glass or asbestos covered wire is advisable.

The invention will be more readily understood by reference to the description of the embodiments of the invention shown in the accompanying drawings.

In these drawings:

Figure 1 is an inverted plan showing an arrangement for heating a saucepan;

Fig. 2 is an elevation thereof;

Fig. 3 is a perspective view illustrating another arrangement for heating a saucepan;

Fig. 4 is a side elevation of the controls forming part of the arrangement shown in Fig. 3;

Fig. 5 is a side elevation of the pressure control means employed.

Referring now to the form of the invention illustrated in Figs. 1 and 2, as shown there is a saucepan 10 to the bottom of which are connected (such as by silver-soldering or other means applicable), two copper rods or tubes 11 and 12, and these rods or tubes at each end are provided with conical internal depressions. There are contact rods 13 and 14 with conical ends that are adapted to seat in the conical depressions in one end of each of the copper rods 11 and 12. These rods 13 and 14 are associated with a transformer 15 supplying the low voltage current.

There are also metal rods 16 and 17 insulated near one end and these have a conical end. These conical ends are adapted to engage in the conical depressions in the copper rods 11 and 12 connected to the saucepan. The rods 16 and 17 are adapted to slide in a block 18. In addition, near the ends the rods are connected to toggle mechanism 19 operated by a lever 20.

When it is desired to heat the saucepan 10, it is placed in position so that the rods 11 and 12 are engaging the rods 13 and 14, and then the rods 16 and 17 are forced into position by the toggle mechanism. The result is that the rods 11 and 12 are held very tightly against the conical ends of the rods 13 and 14 so that there is a very efficient contact made for the passage of the low voltage current which passes through the saucepan and heats the same very rapidly.

The invention as illustrated in Figs. 3 and 4 is also based on the appreciation of the necessity of a good contact being achieved by pressure, this being done in the following manner.

To the bottom of the saucepan 10 are welded, hard-soldered or brazed channel conductors 21 and 22. There are two halves 23 and 24 of a plate which is preferably constructed of a non-magnetic material such as brass, the two halves being insulated from each other and from a mounting bracket 25 which is connected to both of them. On each side of the lower part of the mounting bracket 25 are flanges 26 and 27 which are connected to a spindle 28 sliding in blocks 29. The end of the spindle 28 has a control knob 30 and there is a cam 31 connected to it so as to engage in an opening in the mounting bracket 25.

Low voltage conductors 32 and 33 are provided to supply the electric current for heating, and a micro switch 34 or the like is brought into operation by a cam on the end of the spindle 28.

In use, the spindle 28 and its appurtenant and associated parts, such as the mounting bracket and plate members 23 and 24, are pulled out of the way and then the saucepan is placed so that the channel members 21 and 22 are resting on the low voltage conductors 32 and 33. Thereafter the spindle is pushed in so that the plate members 23 and 24 pass into the openings in the channel members 21 and 22. Then on turning the knob 30, the cam connected to the spindle 28 exerts a downward pressure on the mounting bracket 25. Such pressure is communicated to the two halves 23 and 24 of the plate and they in turn apply a pressure to the inner lower part of the channel members 21 and 22 so that a very efficient contact is made against the low voltage conductors.

It will obviously be advantageous, in fact really necessary, to have some means for regulating the heat applied. This can be done by varying the voltage of the current. There are many obvious ways of doing this, such as by variable primary tappings when using a transformer by varying the resistance or impedance or of the low voltage circuit. A variable choke could be employed but it would be noisy. However the arrangement illustrated in Fig. 5 in association with the arrangement which has been referred to in Figs. 3 and 4 can be used. By the use of such arrangement variable pressure will result in a variable amount of heat being developed. However there is heat given out by resistance but this will mostly be transferred to the vessel. As shown in this form of the invention, the primary conductors such as the one shown at 32 are rabbeted so as to have a flat platform 35. On this are placed a plurality of laminations of hard copper or spring brass such as 36. These in turn are held in place and covered with a copper cover 37, mica lined at the inner sides. As the pressure on the cover 37 is increased, the amount of heat delivered by the current passing through the laminations is increased until with maximum pressure the channel members of the saucepan, such as 21, bear hard against the conductors such as 32, thereby short-circuiting the resistance and maximum current then flows.

It will be desirable that all contact parts and laminations referred to should be nickel-plated to reduce oxidation.

I claim:

1. Means for electrically heating saucepans, frying pans and other vessels comprising channel shaped metal members secured to the bottom thereof; plate members adapted to enter the said channel members; electric contacts connected to a source of low voltage current and adapted to engage with said channel members, the plate members being connected by and insulated from a bracket; a cam adapted to exert pressure on the bracket when engaged therewith; and a spindle carrying the cam and adapted for movement to bring the cam into and out of engagement with the bracket.

2. Means for electrically heating saucepans, frying pans and other vessels as claimed in claim 1, wherein the spindle is also connected to the bracket and the cam is positioned within an opening in the bracket whereby rotation of the spindle causes the cam to engage with the bracket and longitudinal movement thereof effects movement of the plate members relative to said channel members.

References Cited in the file of this patent

UNITED STATES PATENTS

| | | |
|---|---|---|
| 1,921,047 | Sword | Aug. 8, 1933 |
| 2,070,491 | Park | Feb. 9, 1937 |
| 2,233,485 | Park | Mar. 4, 1941 |
| 2,269,689 | Reichold | Jan. 13, 1942 |